United States Patent
Peng et al.

(10) Patent No.: US 8,728,326 B2
(45) Date of Patent: May 20, 2014

(54) POLYMER AND METHODS FOR PREPARING AND USING THE SAME

(75) Inventors: Wenqing Peng, Shanghai (CN); Yangang Liang, Shanghai (CN); Shengxia Liu, Shanghai (CN); Larry Neil Lewis, Scotia, NY (US); Robert James Perry, Niskayuna, NY (US); Stephen Robert Vasconcellos, Doylestown, PA (US); Su Lu, Shanghai (CN); Guixi Zhang, Shanghai (CN)

(73) Assignee: General Electric Company, Schenectady, NY (US)

( * ) Notice: Subject to any disclaimer, the term of this patent is extended or adjusted under 35 U.S.C. 154(b) by 384 days.

(21) Appl. No.: 13/074,733

(22) Filed: Mar. 29, 2011

(65) Prior Publication Data
US 2012/0152851 A1    Jun. 21, 2012

(30) Foreign Application Priority Data
Dec. 17, 2010    (CN) .......................... 2010 1 0613521

(51) Int. Cl.
| | | |
|---|---|---|
| *B01D 21/01* | (2006.01) | |
| *B03D 3/00* | (2006.01) | |
| *C02F 1/52* | (2006.01) | |
| *C08F 220/38* | (2006.01) | |
| *C02F 1/56* | (2006.01) | |
| *C08F 20/02* | (2006.01) | |
| *C08F 20/62* | (2006.01) | |
| *C08F 120/02* | (2006.01) | |
| *C08F 120/62* | (2006.01) | |
| *C08F 220/02* | (2006.01) | |
| *C08F 220/62* | (2006.01) | |
| *C08F 8/34* | (2006.01) | |
| *C08F 8/40* | (2006.01) | |
| *C08F 216/14* | (2006.01) | |
| *C08F 8/26* | (2006.01) | |

(52) U.S. Cl.
CPC ................. *C08F 220/38* (2013.01); *C08F 8/34* (2013.01); *B01D 21/01* (2013.01); *C08F 216/1466* (2013.01); *C08F 8/26* (2013.01); *C02F 1/56* (2013.01); *Y10S 210/912* (2013.01)
USPC ........... 210/723; 210/725; 210/733; 210/736; 210/912; 525/329.7; 525/329.8; 525/343; 525/350

(58) Field of Classification Search
CPC .... C08F 220/38; C08F 8/34; C08F 216/4166; C08F 8/26; C02F 1/56; B01D 21/01
See application file for complete search history.

(56) References Cited

U.S. PATENT DOCUMENTS

| | | | |
|---|---|---|---|
| 4,508,838 A | 4/1985 | Buckl | |
| 5,154,833 A | 10/1992 | Robinson | |
| 5,720,886 A * | 2/1998 | Iwinski | 210/727 |
| 6,586,600 B2 | 7/2003 | Atwood et al. | |
| 7,138,462 B2 * | 11/2006 | Smith et al. | 525/328.4 |
| 7,610,920 B2 | 11/2009 | Fournier et al. | |
| 2005/0043493 A1 | 2/2005 | Smith et al. | |

FOREIGN PATENT DOCUMENTS

| | | | |
|---|---|---|---|
| AU | 2043188 A | | 2/1989 |
| AU | 2043188 A | * | 9/1989 |
| CN | 101726570 A | | 6/2010 |

OTHER PUBLICATIONS

Yantasee et al., "Removal of Heavy Metals from Aqueous Systems with Thiol Functionalized Superparamagnetic Nanoparticles", Environmental Science & Technology, vol. 41, Issue 14, pp. 5114-5119, 2007.

Cheng et al., "Removal of Mercury from Wastewater by Adsorption Using Thiol-Functionalized Eggshell Membrane", Advanced Materials Research, vol. 113-114, pp. 22-26, Jun. 2010.

(Continued)

*Primary Examiner* — Nam Nguyen
*Assistant Examiner* — Clare Perrin
(74) *Attorney, Agent, or Firm* — Wegman, Hessler & Vanderburg

(57) ABSTRACT

The invention relates to a polymer comprising structural units of formula

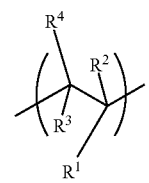

I and formula

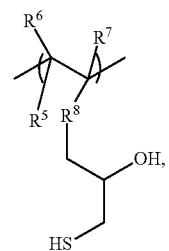

II wherein
$R^1$, $R^2$, $R^5$ and $R^6$ are independently hydrogen, a methyl group, or —COOH, only one of $R^1$ and $R^2$ or $R^5$ and $R^6$ is —COOH; $R^3$ and $R^7$ are independently hydrogen, or a methyl group;
$R^4$ is —COOH, —CONH$_2$ or —OH, when $R^4$ is —OH, $R^1$, $R^2$ and $R^3$ are respectively hydrogen; and
$R^8$ is —COO, —CONH, or —O—, when $R^8$ is —O—, $R^5$, $R^6$ and $R^7$ are respectively hydrogen.

Methods for preparing and using the polymer are also described herein.

8 Claims, No Drawings

(56) References Cited

OTHER PUBLICATIONS

Unofficial English translation of Office Action issued in connection with corresponding CN Application No. 201010613521.6 on Nov. 27, 2013.

Kucharski et al., "Copolymerization of Hydroxyalkyl Methacrylates with Acrylamide and Methacrylamide I. Determination of Reactivity Ratios", Journal of Applied Polymer Science, pp. 1259-1265, May 16, 1997.

* cited by examiner

POLYMER AND METHODS FOR PREPARING AND USING THE SAME

BACKGROUND

The invention relates generally to polymers and methods for preparing and using the polymers. In particular, the invention relates to copolymers, methods for preparing the copolymers, and methods for using the copolymers to remove heavy metals from aqueous solutions.

Heavy metal pollution is an existing and growing worldwide problem. For example, waste water issuing from waste treatment facilities, from the chlor-alkali industry, from the metal finishing industry, and from certain municipal landfills often presents a metal contamination problem. Similarly, the metal content of water exiting both or either of functional and abandoned mines is a significant environmental issue in geographical areas with a mining industry.

Different treatment techniques have been developed to remove either or both dissolved and suspended heavy metal ions from industrial waters and wastewaters. One common practice is to precipitate the bulk of the heavy metal contaminant as its metal hydroxide. Metal ions such as copper and lead are easily precipitated in this way, but the minimum concentration that can be obtained is limited by the finite solubility of the hydroxide complexes. The resulting effluent from the hydroxide precipitation may be treated with a metal scavenging agent to remove any trace metal contaminants to meet discharge regulations. These agents may be precipitants, adsorbents, or metal specific ion exchange resins. The metal scavenger precipitants may also be effective when added in the same step as the hydroxide precipitation. Typical compounds utilized as precipitating scavenging agents include sulfides, (thio)carbonates, alkyl dithiocarbamates, mercaptans, and polydithiocarbamates.

The prior art scavenging agents have limitations. The metal thiocarbonates, sulfides, mercaptans, and thiocarbamates form fine flocs which are not conducive to settling and typically require the use of a flocculation agent. The metal thiocarbonates, sulfides, mercaptans, and thiocarbamates are unstable over time and under certain pH conditions because the thiocarbonates, sulfides, mercaptans, and thiocarbamates lack sufficient binding sites for heavy metal ions. Such unstable precipitates may release bound metal back into the environment, thereby proving unsatisfactory as treatment or remediation agents. Prior art polydithiocarbamates are characterized as having limited water solubility, which limits the possible degree of functionalization. In addition, a number of the prior art scavenging agents are themselves very toxic and care must be taken to ensure that they are not present in the discharged wastewater.

There exists a need, therefore, for a new material to remove heavy metals from aqueous solutions. It is desirable that this material is less toxic and forms larger, and faster settling precipitates than the prior art compounds which remain stable over a range of environmental conditions and over extended periods of time. It is also desirable that this material is water-soluble so it can be utilized in existing clarification facilities, avoiding the need for capital investment in resin-bed apparatus or other specialized equipment. It is also desirable that this material can be prepared easily and cheaply, and has an adequate molecular weight, chemical stability, and high affinity for one or more heavy metal ions.

BRIEF DESCRIPTION

Embodiments of the invention include polymers and methods for preparing and using the polymers.

In one embodiment, a polymer comprises structural units of formula

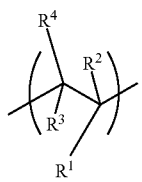

I and formula

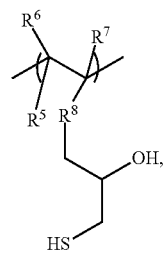

II wherein
$R^1$, $R^2$, $R^5$ and $R^6$ are independently hydrogen, a methyl group, or —COOH, only one of $R^1$ and $R^2$ or $R^5$ and $R^6$ is —COOH;
$R^3$ and $R^7$ are independently hydrogen, or a methyl group;
$R^4$ is —COOH, —CONH$_2$ or —OH, when $R^4$ is —OH, $R^1$, $R^2$ and $R^3$ are respectively hydrogen; and
$R^8$ is —COO, —CONH, or —O—, when $R^8$ is —O—, $R^5$, $R^6$ and $R^7$ are respectively hydrogen.

In another embodiment, a method comprises:
providing a polymer comprising structural units of formula

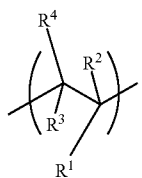

I and formula

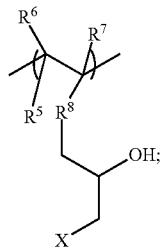

III and reacting the polymer comprising the structural units of formula I and formula III with a hydrosulfide salt or a sulfide salt to form a polymer comprising structural units of formula

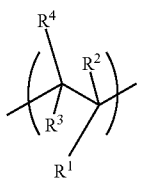

I and formula

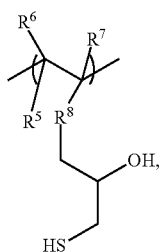

II wherein $R^1$, $R^2$, $R^5$ and $R^6$ are independently hydrogen, a methyl group, or —COOH, only one of $R^1$ and $R^2$ or $R^5$ and $R^6$ is —COOH;

$R^3$ and $R^7$ are independently hydrogen, or a methyl group;

$R^4$ is —COOH, —CONH$_2$ or —OH, when $R^4$ is —OH, $R^1$, $R^2$ and $R^3$ are respectively hydrogen;

$R^8$ is —COO, —CONH, or —O—, when $R^8$ is —O—, $R^5$, $R^6$ and $R^7$ are respectively hydrogen; and X is halogen.

In another embodiment, a method comprises:

adding an effective amount of a polymer to an aqueous solution to form precipitates comprising at least one of heavy metals; and removing the precipitates from the aqueous solution;

the polymer comprising structural units of formula

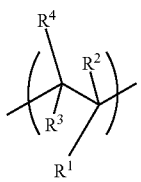

I and formula

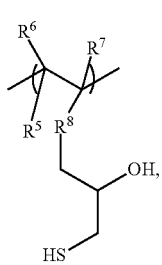

II wherein $R^1$, $R^2$, $R^5$ and $R^6$ are independently hydrogen, a methyl group, or —COOH, only one of $R^1$ and $R^2$ or $R^5$ and $R^6$ is —COOH;

$R^3$ and $R^7$ are independently hydrogen, or a methyl group;

$R^4$ is —COOH, —CONH$_2$ or —OH, when $R^4$ is —OH, $R^1$, $R^2$ and $R^3$ are respectively hydrogen; and $R^8$ is —COO, —CONH, or —O—, when $R^8$ is —O—, $R^5$, $R^6$ and $R^7$ are respectively hydrogen.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value. Moreover, the suffix "(s)" as used herein is usually intended to include both the singular and the plural of the term that it modifies, thereby including one or more of that term.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

In one embodiment, a polymer comprises structural units of formula

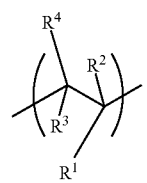

I and formula

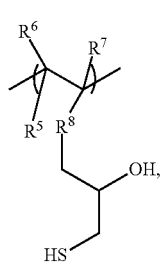

II wherein
- $R^1$, $R^2$, $R^5$ and $R^6$ are independently hydrogen, a methyl group, or —COOH, only one of $R^1$ and $R^2$ or $R^5$ and $R^6$ is —COOH;
- $R^3$ and $R^7$ are independently hydrogen, or a methyl group;
- $R^4$ is —COOH, —CONH$_2$ or —OH, when $R^4$ is —OH, $R^1$, $R^2$ and $R^3$ are respectively hydrogen; and
- $R^8$ is —COO, —CONH, or —O—, when $R^8$ is —O—, $R^5$, $R^6$ and $R^7$ are respectively hydrogen.

The polymer may be random, block or graft copolymers, or a polymer having an intermediate structure thereof, for example, a random copolymer having blocky sequences. Orientations of individual structural units with respect to each other and connections between individual structural units in the polymers may be head-to-head, tail-to-tail or head-to-tail. For example, if —CR$_1$R$_2$— and —CR$_5$R$_6$— are heads, —CR$_5$R$_6$— may be joined to —CR$_1$R$_2$— or —CR$_3$R$_4$—.

In some embodiments, the polymer is of formula:

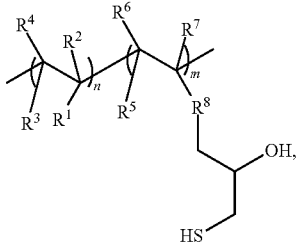

wherein n is an integer greater than 0, m is an integer greater than 0, and the polymer has a molecular weight of from about 500 to about 2,000,000.

The terms "n" and "m" used herein refer to relative total amounts (e.g., numbers, moles, . . . etc.) of structural units of formulas I and II in the polymer and do not indicate the structure of the polymer. The structural units of formulas I and II may be arranged alternately, or either of the structural units of formulas I and II may repeat itself twice or more times in the polymer before it connects to another different structural unit. A ratio of n to m may be in a broad range. In some embodiments, a ratio of n to m is from about 1:99 to about 99:1, or preferably from about 10:90 to about 90:10, or more preferably from about 30:70 to about 70:30.

Examples of monomers which the structural unit of formula I may be derived from include but are not limited to:

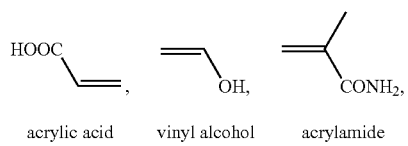

acrylic acid    vinyl alcohol    acrylamide

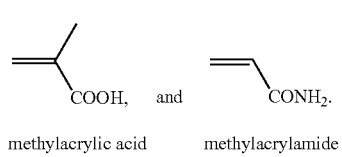

methylacrylic acid    methylacrylamide

Examples of monomers which the structural unit of formula II may be derived from include but are not limited to:

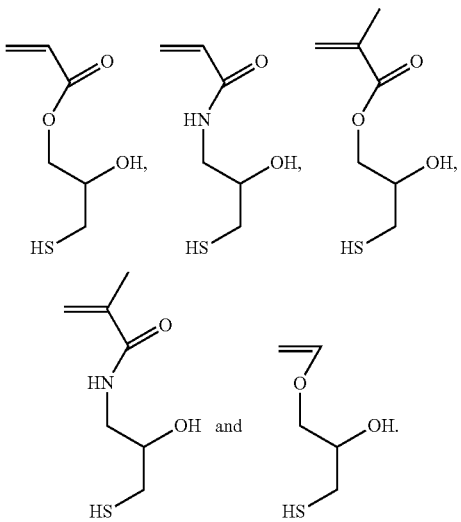

In some embodiments, the polymer is of formula:

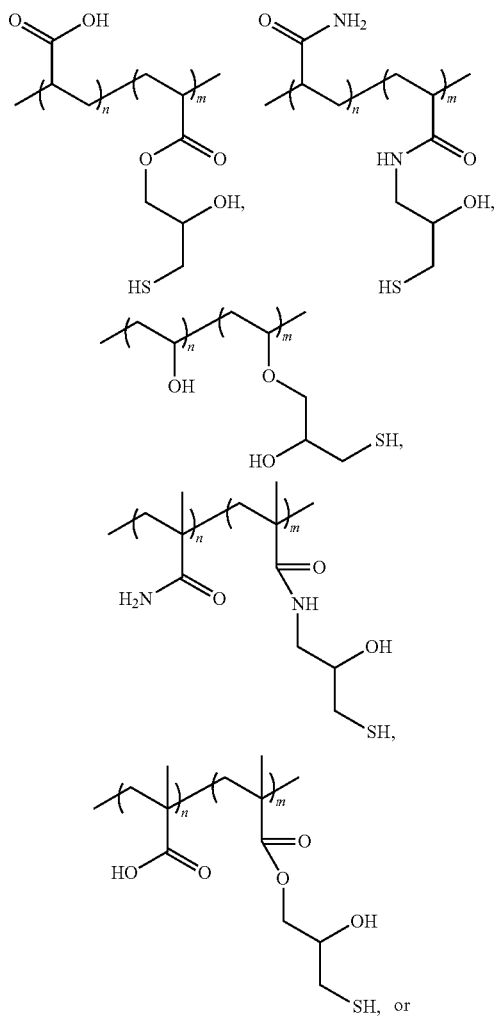

-continued

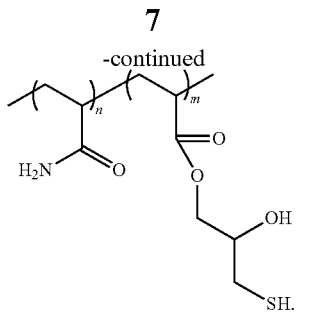

In some embodiments, the polymer is of formula:

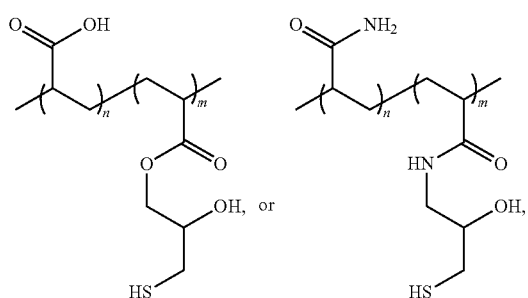

in which n:m is from about 60:40 to about 70:30, and molecular weight (Mw) of the polymer is from about 5,000 to about 100,000.

The polymer may comprise two or more different structural units derived from monomers described above although only polymers with two different structural units are set as examples herein.

In another embodiment, a method comprises:
providing a polymer comprising structural units of formula

I

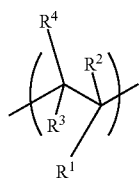

and formula

III

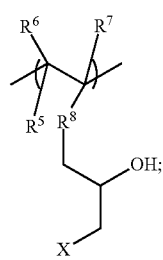

and
reacting the polymer comprising the structural units of formula I and formula III with a hydrosulfide salt or a sulfide salt to form a polymer comprising structural units of formula I and formula

II

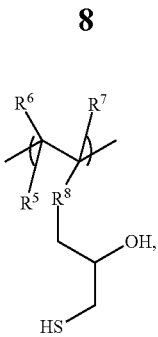

wherein
$R^1$, $R^2$, $R^5$ and $R^6$ are independently hydrogen, a methyl group, or —COOH, only one of $R^1$ and $R^2$ or $R^5$ and $R^6$ is —COOH;
$R^3$ and $R^7$ are independently hydrogen, or a methyl group;
$R^4$ is —COOH, —CONH$_2$ or —OH, when $R^4$ is —OH, $R^1$, $R^2$ and $R^3$ are respectively hydrogen;
$R^8$ is —COO, —CONH, or —O—, when $R^8$ is —O—, $R^5$, $R^6$ and $R^7$ are respectively hydrogen; and
X is halogen.

In some embodiments, the hydrosulfide salt is sodium hydrosulfide or potassium hydrosulfide and the sulfide salt is sodium sulfide or potassium sulfide.

In some embodiments, X is Cl.

In some embodiments, the polymer comprising the formula I and the formula III is prepared by epoxy ring opening reaction between a polymer comprising the structural units of formula I and epichlorohydrin.

In some embodiments, the polymer comprising the formula I and the formula III is prepared by copolymerizing a monomer of formula

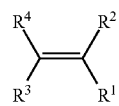

with a monomer of formula

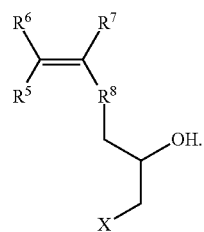

In some embodiments, the monomer of formula

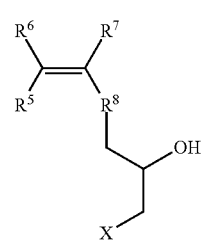

is prepared by epoxy ring opening reaction between the monomer of formula

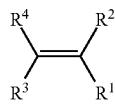

and epichlorohydrin.

In another embodiment, a method comprises: adding an effective amount of a polymer to an aqueous solution to form precipitates comprising at least one of heavy metals; and removing the precipitates from the aqueous solution; the polymer comprising structural units of formula I and formula II, wherein $R^1$, $R^2$, $R^5$ and $R^6$ are independently hydrogen, a methyl group, or —COOH, only one of $R^1$ and $R^2$ or $R^5$ and $R^6$ is —COOH; $R^3$ and $R^7$ are independently hydrogen, or a methyl group; $R^4$ is —COOH, —CONH$_2$ or —OH, when $R^4$ is —OH, $R^1$, $R^2$ and $R^3$ are respectively hydrogen; and $R^8$ is —COO, —CONH, or —O—, when $R^8$ is —O—, $R^5$, $R^6$ and $R^7$ are respectively hydrogen.

The heavy metals may be any heavy metals existing in any forms that need to and may be removed by the polymer of the present invention, such as aluminium (Al), arsenic (As), beryllium (Be), bismuth (Bi), cadmium (Cd), cobalt (Co), chromium (Cr), copper (Cu), iron (Fe), mercury (Hg), manganese (Mn), molybdenum (Mo), nickel (Ni), lead (Pb), plutonium (Pu), tin (Sn), thorium (Th), thallium (Tl), uranium (U), vanadium (V), tungsten (W), zirconium (Zr), and zinc (Zn). In some embodiments, the heavy metals comprise at least one of chromium (Cr), copper (Cu), zinc (Zn), lead (Pb), cobalt (Co), cadmium (Cd), and nickel (Ni).

The polymer may be added alone or in combination with other additives. Examples of other additives include but are not limited to inorganic or polymer flocculants. The amount of the polymer added may vary according to the application environment, e.g., the amount and type of heavy metals to be removed and effects of other materials coexisting with heavy metals in the aqueous solutions. In some embodiments, a concentration ratio by weight of each of the at least one of the heavy metals to the polymer in the aqueous solution is from about 5:1 to about 1:100, or preferably from about 1:1 to about 1:50, or more preferably from about 1:5 to about 1:20.

Examples of polymers that may be added alone or in combination with each other include, but are not limited to:

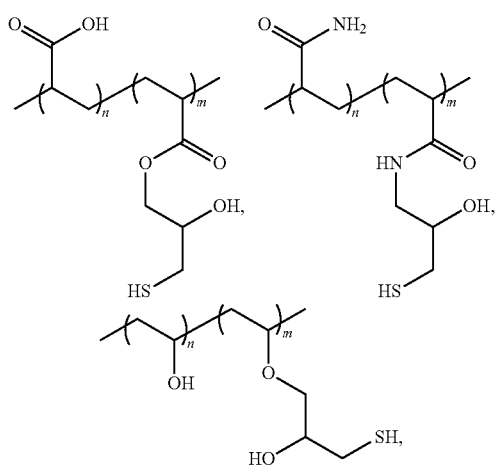

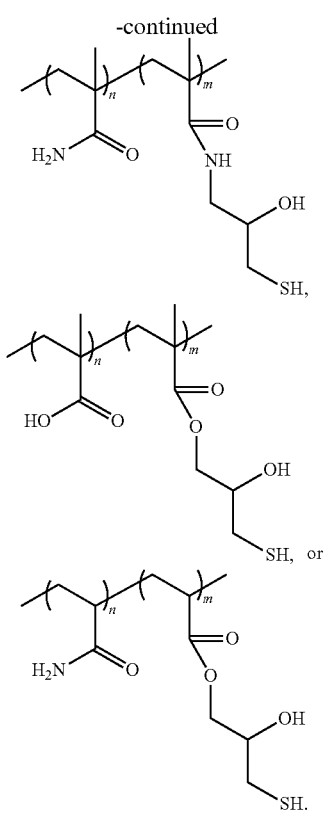

In some embodiments, the polymer is of formula:

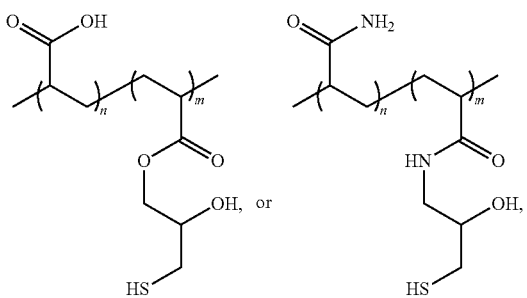

in which n:m is from about 60:40 to about 70:30, and the polymer has a Mw of from about 5,000 to about 100,000.

The precipitates may be removed by any suitable ways. In some embodiments, the removing is by filtering the precipitates from the aqueous solution or by sedimentation.

EXAMPLES

The following examples are included to provide additional guidance to those of ordinary skill in the art in practicing the claimed invention. Accordingly, these examples do not limit the invention as defined in the appended claims.

Acrylic acid, acrylamide, methylacrylamide, methacrylic acid, hydrochloric acid (37% solution), epichlorohydrin, potassium hydroxide, sodium hydroxide, ethanol and isopropanol were from Sinopharm Chemical Reagent Co., Ltd., Shanghai, China. Poly(acrylic acid) (Mw: about 1800), poly(vinyl alcohol) (average Mw 13,000-23,000, 98% hydrolyzed), sodium hydrosulfide (NaHS·H$_2$O) and sodium persulfate ($Na_2S_2O_8$) were from Aldrich Chemical Co., Milwaukee, Wis., USA. Chemicals were used without further purification, unless specified otherwise. Atomic absorption Spectrometer (AA)/inductively coupled plasma (ICP) standard solutions of chromium (Cr), copper (Cu), zinc (Zn), lead (Pb), cobalt (Co), cadmium (Cd), selenium (Se), boron (B) and nickel (Ni) were obtained from Shanghai Analytical Center, at concentrations of from 1,000 ppm to 10,000 ppm. Each of the ICP standard solutions comprises 2-10% (by weight) of nitric acid.

Nuclear magnetic resonance (NMR) spectra were recorded on a Bruker Avance™ 400 ($^1H$ & $^{13}C$, 400 MHz) spectrometer and referenced versus residual solvent shifts.

Molecular weights were determined using gel permeation chromatography (GPC) analyses performed at 40° C. using an apparatus equipped with a Waters 590 pump and a Waters 717-plus injector. A differential refractometry (Waters R410) was used for detection. The column set were Shodex SB-805 HQ/SB-804 HQ with SB-G guard column. The eluent was the aqueous solution of 0.1 mol/l $NaNO_3$ and 0.02% by weight $NaN_3$ and had a flow rate of 0.5 mL/min. Calibration was performed using polyacrylic acid sodium salt (Mp 2,925-782, 200). The software used for data acquisition, calibration and treatment was Cirrus™ multidetector GPC software.

Example 1

Synthesis of Poly(Acrylic Acid)

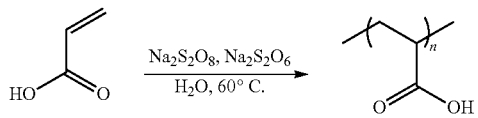

To a 100 mL three-necked round bottom flask equipped with a thermometer, a nitrogen inlet and an addition inlet was charged 50 g of deionized water and 0.25 g of sodium metabisulfite ($Na_2S_2O_6$, 1.22 mmol). The solution was heated to 60° C. Then an aqueous solution of acrylic acid (10 g, 0.138 mol) and sodium persulfate (0.125 g, 0.52 mmol) was charged dropwise over 30 minutes under nitrogen atmosphere. Upon completion of the addition, the reaction mixture was heated to 70° C. for 90 minutes and was then cooled to room temperature. The pH of the resulting solution was measured to be about 3. The structure of the resulting polymer was verified by $^1H$ NMR. $^1H$ NMR ($\delta$, $D_2O$) 2.21 (br, 1H), 1.75-1.43 (br, 2H). Mw: 5521, PD (polydispersity): 2.7.

Example 2

Esterification of Poly(Acrylic Acid) with Epichlorohydrin

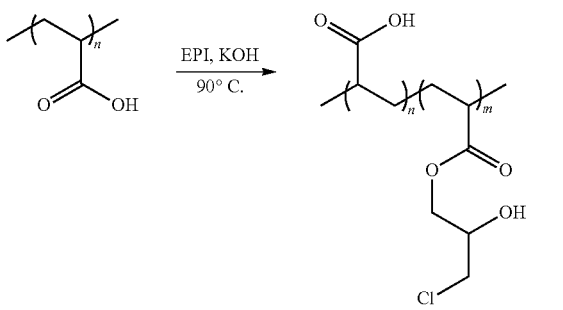

To a 100 mL three neck round bottom flask equipped with a thermometer, a nitrogen inlet and an addition inlet was charged 20 g of deionized water and 4 g (55.6 mmol) of poly(acrylic acid) obtained from example 1. Epichlorohydrin (EPI, 6.172 g, 66.8 mmol) and potassium hydroxide (72 mg) were added while stirring and being cooled by the ice water for 30 minutes. The obtained solution was heated to 90° C. for 4 hours and was then cooled to the room temperature. The structure of the resulting copolymer (Mw=5521) was verified by $^1H$ NMR as evidenced by the peaks between the region of 1-4.5 ppm, $^1H$ NMR ($\delta$, $D_2O$) 1.64-2.38 (br, 3 H), 3.63 (br, 1.33 H), 3.88 (br, 0.65H), 4.12 (br, 1.4H). The structure of the resulting copolymer was also verified by $^{13}C$ NMR as evidenced by the peaks between the region of 170-190 ppm, $^{13}C$ NMR ($\delta$, $D_2O$) 176 (br, 1.04H), 179 (br, 1H).

Example 3

Synthesis of Poly(Acrylic Acid) with 2-hydroxy-3-mercaptopropoxy Pendant Group

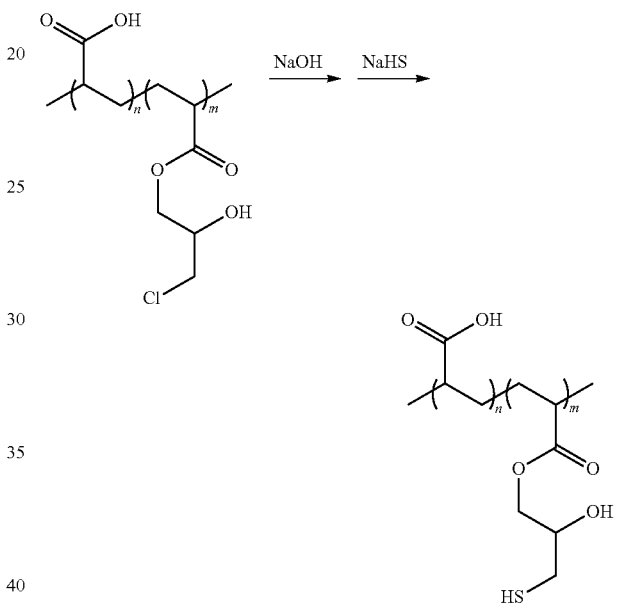

To a 50 mL round bottom flask was charged 10 g of deionized water and the copolymer (3.46 g, 27.8 mmol) obtained in example 2. Then the pH of the solution was adjusted to about 7 using NaOH. The solution was added to a buffer solution of sodium hydrosulfide (3 g, 40 mmol, pH: 8.0) dropwise for over 30 minutes. The obtained solution was heated to 40° C. for 2 hours and was then allowed to cool to the room temperature. The structure of the resulting copolymer (m:n=3:7) was verified by $^1H$ NMR as evidenced by the peaks between the region of 0-4.5 ppm, $^1H$ NMR ($\delta$, $D_2O$) 1.54-2.38 (br), 2.62-2.85 (br), 3.62-4.17 (br).

Example 4

Esterification of Acrylic Acid

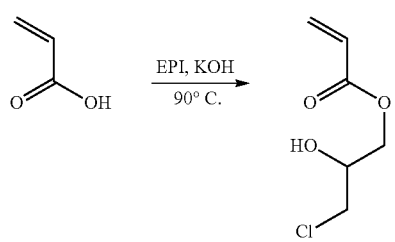

To a 25 mL three neck round bottom flask equipped with a thermometer, a nitrogen inlet and an addition inlet was charged 2.1 g (29 mmol) of acrylic acid. Then epichlorohydrin (EPI, 1.34 g, 14.5 mmol) and potassium hydroxide (30 mg) were added. While sparging with nitrogen, the solution was heated to 85° C. for 4 hours. Then the solution was cooled to the room temperature. The structure of the resulting 3-chloro-2-hydroxypropyl acrylate was verified by $^{13}$C NMR as evidenced by the peaks between the region of 160-180 ppm, $^{13}$C NMR (δ, D$_2$O) 168 (br, 0.98H), 170 (br, 1H).

Example 5

Copolymerization of Acrylic Acid with 3-chloro-2-hydroxypropyl acrylate

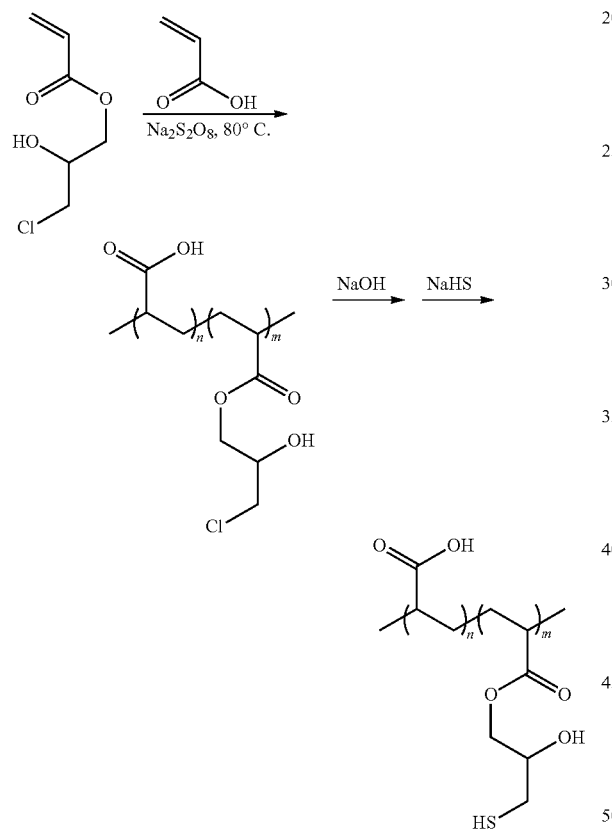

To a 25 mL three neck round bottom flask equipped with a thermometer, a nitrogen inlet and an addition inlet was charged 10 g of deionized water. Sodium persulfate (0.32 g) and 1.1 g of a mixture (ratio: 1:1) of 3-chloro-2-hydroxypropyl acrylate and acrylic acid were added dropwise for over 30 minutes at 80° C. The solution was maintained at 80° C. for 3 hours and was then cooled to the room temperature. The pH of the solution was adjusted to about 7 using sodium hydroxide. Then the solution was added to the solution of sodium hydrosulfide (0.68 g, 9.1 mmol, in a pH 8.0 buffer solution) dropwise for over 30 minutes. The solution was heated to 40° C. for 2 hours. Then the solution was allowed to cool to the room temperature and added to 100 ml of ethanol to get precipitates of the resulting copolymer (m:n=3:7, Mw=50,224), the structure of which was verified by $^1$H NMR as evidenced by the peaks between the region of 0-4.5 ppm, $^1$H NMR (δ, D$_2$O) 1.45-2.4 (br), 3.68 (br), 4.16 (br).

Example 6

Synthesis of the Polyacrylamide

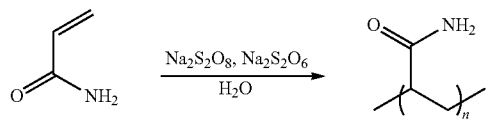

To a 50 mL three-necked round bottom flask equipped with a thermometer, a nitrogen inlet and an addition inlet was charged 20 g of deionized water and 114 mg of sodium metabisulfite (Na$_2$S$_2$O$_6$). The solution was heated to 50° C. An aqueous solution comprising acrylamide (2.85 g, 40 mmol) and sodium persulfate (57 mg) was added dropwise for over 15 minutes under nitrogen atmosphere. Upon completion of the addition, the solution was heated to 60° C. for 90 minutes and then cooled to the room temperature. The structure of obtained poly(acrylamide) was verified by $^1$HNMR. $^1$H NMR (δ, D$_2$O) 2.23 (br, 1H), 1.65 (br, 2H).

Example 7

Epoxy Ring Opening Reaction between Polyacrylamide and Epichlorohydrin

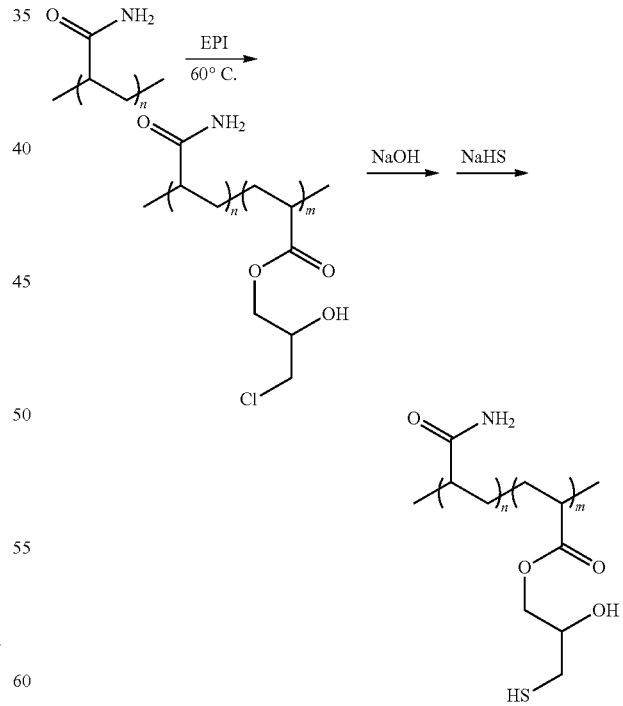

To a 25 mL three neck round bottom flask equipped with a thermometer, a nitrogen inlet and an addition inlet was charged 10 g of deionized water. Then 0.77 g of polyacrylamide (10.83 mmol) and EPI (0.75 g, 8.12 mmol) were added. Adjusted the pH of the solution to about 10, and heated the solution to 60° C. for 3 hours. The solution was then cooled to the room temperature, and charged to a solution of sodium hydrosulfide (0.7 g, 9.6 mmol, in a pH 8.0 buffer solution) dropwise for over 30 minutes. The obtained solution was heated to 40° C. for 2 hours and was allowed to cool to the room temperature. The resulting copolymer (m:n=4:6) was precipitated using 150 ml of ethanol and the structure of the resulting copolymer was verified by $^1$H NMR as evidenced by the peaks between the region of 0-4.5 ppm, $^1$H NMR (δ, D$_2$O) 1.5 (br), 2.18 (br), 2.7 (br), 3.6-4.02 (br).

Example 8

Synthesis of Polyacrylamide with 2-hydroxy-3-mercaptopropoxy Pendant Group

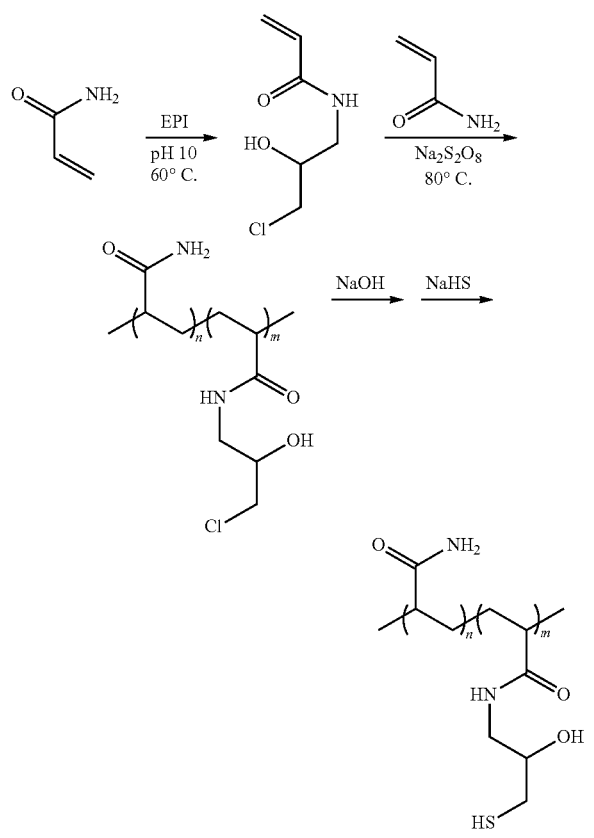

To a 25 mL three neck round bottom flask equipped with a thermometer, a nitrogen inlet and an addition inlet was charged 10 g of deionized water. Acrylamide (1 g, 14.1 mmol) and EPI (1.04 g, 11.28 mmol) were added into the deionized water. The pH of the solution was adjusted to about 10, and the solution was heated to 60° C. for 3 hours. After the solution was cooled to the room temperature, 114 mg of sodium metabisulfite (Na$_2$S$_2$O$_6$) was added. The solution was heated to 50° C. before an aqueous solution comprising acrylamide (0.72 g, 10 mmol) and sodium persulfate (57 mg) was charged dropwise for over 15 minutes under nitrogen atmosphere. Upon completion of the addition, the solution was heated to 80° C. for 90 minutes. The solution was cooled to the room temperature, and was added to a buffer solution of sodium hydrosulfide (1.41 g, 13.5 mmol, pH=8.0) dropwise for over 30 minutes. The obtained solution was heated to 40° C. for 2 hours and was allowed to cool to the room temperature. The resulting copolymer (m:n=2.5:7.5) was precipitated from 100 ml ethanol and the structure was verified by $^1$H NMR as evidenced by the peaks between the region of 0-4.5 ppm, $^1$H NMR (δ, D$_2$O) 1.5 (br), 2.18 (br), 2.7 (br), 3.6-4.02 (br).

Example 9

Synthesis of Poly(Vinyl Alcohol) with 2-hydroxy-3-mercaptopropoxy Pendant Group

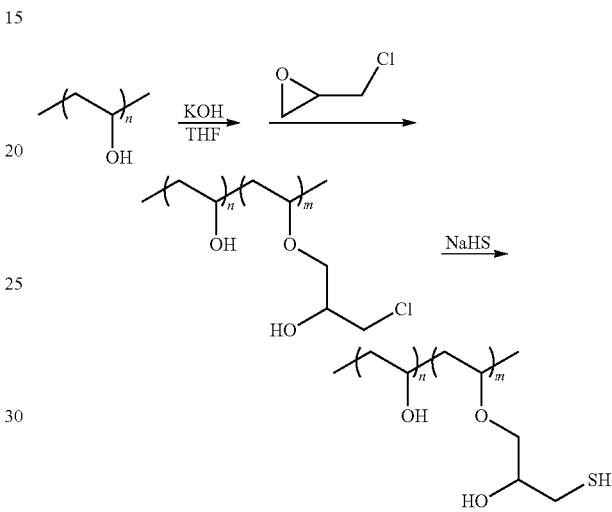

To a 50 mL of three neck round bottom flask equipped with a thermometer, a nitrogen inlet and an addition inlet was charged 15 g of tetrahydrofuran (THF) and 1 g (22.7 mmol) of poly(vinyl alcohol) (Mw 13,000-23,000). Epichlorohydrin (0.84 g, 9.1 mmol) and potassium hydroxide (9.2 mg) were charged and stirred for 30 minutes. The obtained solution was heated to 70° C. under reflux for 4 hours and was then cooled to the room temperature. The solution was charged to a solution of sodium hydrosulfide (NaHS·H$_2$O) (0.81 g, 11 mmol in 10 g deionized water) dropwise in 30 minutes. The solution was heated to 40° C. for 2 hours and was then allowed to cool to the room temperature. The structure of the resulting polymer (m:n=2:8, Mw 13,000-23,000) in the solution was verified by $^1$H NMR as evidenced by the peaks between the region of 0-4.5 ppm, $^1$H NMR (6, DMSO) 1.37 (br), 1.93 (br), 2.75 (br), 3.62-4.17 (br).

Example 10

Synthesis of Poly (Methylacrylamide) with 2-hydroxy-3-mercaptopropoxy Pendant Group

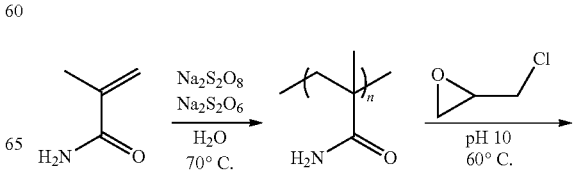

-continued

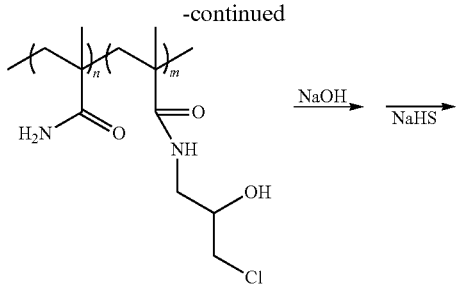

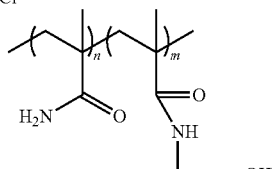

To a 50 mL three-neck round bottom flask equipped with a thermometer, a nitrogen inlet and an addition inlet was charged 20 g of deionized water and 114 mg of sodium metabisulfite ($Na_2S_2O_6$). The solution was heated to 70° C. Then an aqueous solution comprising methylacrylamide (3.4 g, 40 mmol) and sodium persulfate (57 mg) was charged dropwise for over 15 minutes under nitrogen atmosphere. Upon completion of the addition, the mixture was heated to 60° C. for 90 minutes and was then cooled to the room temperature. The structure of the resulting polymer (poly(methylacrylamide)) in the solution was verified by $^1$H NMR ($\delta$, $D_2O$) 1.33 (br, 3H), 1.65 (br, 2H).

Poly(methylacrylamide) (obtained above, 0.91 g, 10.83 mmol) was charged to a 25 mL three neck round bottom flask equipped with a thermometer, a nitrogen inlet and an addition inlet. Deionized water (10 g) and EPI (0.75 g, 8.12 mmol) were then charged. The pH of the solution was adjusted to about 10 with sodium hydroxide. The solution was heated to 60° C. for 3 hours and was then cooled to the room temperature. The solution was charged to a buffer solution of sodium hydrosulfide (0.7 g, 9.6 mmol, pH 8.0) dropwise for over 30 minutes. The obtained solution was heated to 40° C. for 2 hours and was then allowed to cool to the room temperature. The resulting copolymer (m:n=4:6) was precipitated using ethanol (150 ml) and the structure of the copolymer was verified by $^1$H NMR as evidenced by the peaks between the region of 0-4.5 ppm, $^1$H NMR ($\delta$, $D_2O$) 1.32 (br), 1.5 (br), 2.7 (br), 3.6-4.02 (br).

Example 11

Esterification of Methacrylic Acid
(3-chloro-2-hydroxypropyl methacrylate)

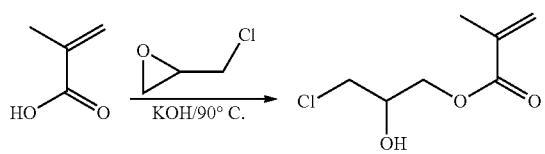

To a 25 mL three neck round bottom flask equipped with a thermometer, a nitrogen inlet and an addition inlet was charged 2 g (23.23 mmol) of methacrylic acid. Epichlorohydrin (0.86 g, 9.3 mmol) and potassium hydroxide (14.3 mg) were charged. While sparging with nitrogen, the solution was heated to 90° C. for 4 hours and was then cooled to the room temperature. The structure of the resulting product was verified by $^1$H NMR as evidenced by the peaks between the region of 1-7 ppm, $^1$H NMR ($\delta$, $D_2O$) 2.02 (s, 3H), 3.5 (m, 2 H), 4.05-4.5 (br, 3H), 6.50 (m, 2H).

Example 12

Synthesis of Poly(Methacrylic Acid) with
2-hydroxy-3-mercaptopropoxy Pendant Group

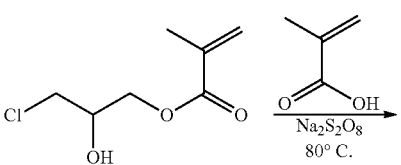

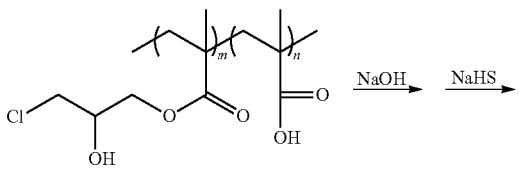

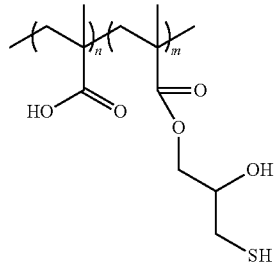

To a 25 mL three neck round bottom flask equipped with a thermometer, a nitrogen inlet and an addition inlet was charged 10 g of deionized water, then sodium persulfide (0.32 g) and 1.5 g of a mixture of 3-chloro-2-hydroxypropyl methacrylate and methacrylic acid (1:1) were charged dropwise for over 30 minutes at 80° C. The solution was maintained at 80° C. for 3 hours before it was cooled to room temperature. PH of the solution was adjusted to 7 with sodium hydroxide. The solution was then charged to a buffer solution of sodium hydrosulfide (0.75 g, 10 mmol, pH 8.0) dropwise for over 30 minutes. The obtained solution was heated to 40° C. for 2 hours and was allowed to cool to the room temperature. The resulting copolymer (m:n=3:7) was precipitated using 100 ml ethanol and the structure of the copolymer was verified by $^1$H NMR as evidenced by the peaks between the region of 0-4.5 ppm, $^1$H NMR ($\delta$, $D_2O$) 1.34 (br), 1.55 (br), 2.50-3.12 (br), 3.68 (br), 4.16 (br).

Example 13

Synthesis of Copolymer of Acryamide and 3-thiol-2-hydroxypropyl acrylate

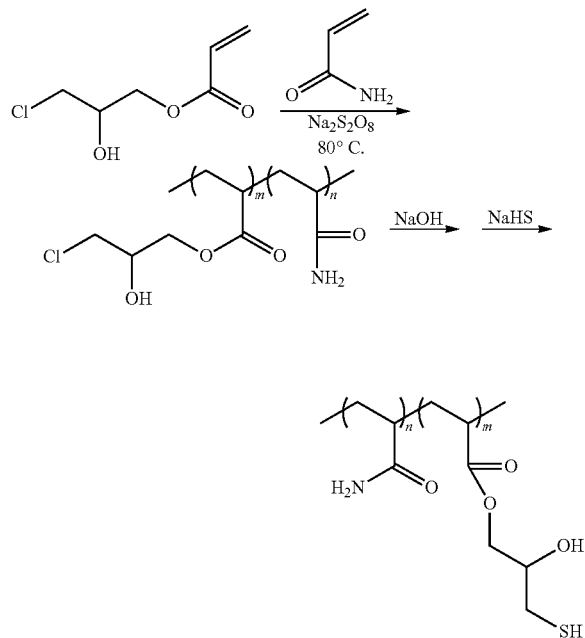

To a 25 mL three neck round bottom flask equipped with a thermometer, a nitrogen inlet and an addition inlet was charged 10 g of deionized water, then 1.1 g mixture of 3-chloro-2-hydroxypropyl acrylate and acrylamide (1:1) and sodium persulfide (0.32 g) were charged dropwise over 30 minutes at 80° C., then the solution was maintained at 80° C. for 3 hours. The mixture was cooled to room temperature; pH was adjusted to 7 with sodium hydroxide. Then the mixture solution was charged to the solution of sodium hydrosulfide (0.68 g, 9.1 mmol, in pH 8.0 buffer solution) dropwise over 30 minutes, the solution was heated to 40° C. for 2 hours. Then the reaction was allowed to cool to room temperature. The resulting copolymer (m:n=3.5:6.5) was precipitated from ethanol and the structure was verified by $^1$H NMR as evidenced by the peaks between the region of 0-4.5 ppm, $^1$H NMR ($\delta$, $D_2O$) 1.45-2.4 (br), 2.51-3.12 (br), 3.68 (br), 4.16 (br).

Example 14

Heavy Metal Removal Tests

In this experiment, the apparatuses include beakers (500 ml), a Phipps and Bird™ jar tester with six standard paddles, a pH meter, plastic syringes, 0.45 micron filters and glass sample bottles.

Firstly, 9 atomic absorption Spectrometer (AA)/Inductive Coupled Plasma-mass Spectrometer (ICP) single element standard solutions respectively comprising Cd, Cr, Cu, Se, Pb, Ni, B, Co, and Zn were added into deionized water in a plastic beaker (5 L) to prepare 3 L of a stock solution.

The pH of the stock solution was adjusted to specified values. A sample of the stock solution (5 ml) was taken for an ICP analysis using an ICP-OES (Inductively coupled plasma optical emission spectrometry) analyzer (Spectro Ciros, SPECTRO Analytical Instruments GmbH, Cleves, Germany). The stock solution was added into six clean 500 ml beakers respectively (400 ml/beaker) in the jar tester. A given amount of the polymer were added into the beaker so that the concentration of the polymer in the stock solution was 9 ppm, 45 ppm or 90 ppm as shown in tables below. The polymer dosage was calculated based on weight of polymer added into the stock solution, e.g., 1 ppm means 1 mg of polymer were dosed into 1 L of stock solution. The obtained mixture was stirred at 100 rpm for 2 minutes, at 35 rpm for 5 minutes, and left settling for 5 minutes.

A sample (5 ml) of the supernate in the beaker was taken after settling for an ICP analysis. Another sample (5 ml) of the supernate was taken from the beaker to be filtered through a 0.45 micron filter. An ICP analysis of the filtrate was conducted.

Table 1 below shows the ICP analysis result (concentration) of each of Cr, Cu, Zn, Pb, Co, Cd and Ni in the stock solution (pH=9.15), the supernate, and the filtrate and the reduction rate of each of Cr, Cu, Zn, Pb, Co, Cd and Ni after being treated by different concentrations (shown in table 1 below) of polymer obtained in example 3 and being filtered. The reduction rate was calculated by this formula: reduction rate (%)=(concentration of stock solution-concentration of supernate or filtrate)/concentration of stock solution×100.

TABLE 1

| polymer | sample | | Cr | Cu | Zn | Pb | Co | Cd | Ni |
|---|---|---|---|---|---|---|---|---|---|
| 0 | the stock solution | concentration (ppm) | 0.87 | 1.18 | 1.14 | 0.92 | 1.17 | 0.80 | 1.23 |
| 9 ppm | supernate | concentration (ppm) | 0.84 | 0.39 | 0.30 | 0.49 | 0.32 | 0.63 | 0.34 |
| | | reduction rate (%) | 3.57 | 66.75 | 73.73 | 46.24 | 72.55 | 20.87 | 72.52 |
| | filtrate | concentration (ppm) | 0.80 | 0.05 | 0.02 | 0.34 | 0.05 | 0.53 | 0.05 |
| | | reduction rate (%) | 8.31 | 95.93 | 98.14 | 63.04 | 96.13 | 33.78 | 95.78 |
| 45 ppm | supernate | concentration (ppm) | 0.82 | 0.24 | 0.20 | 0.54 | 0.25 | 0.57 | 0.29 |
| | | reduction rate (%) | 5.74 | 79.58 | 82.14 | 41.17 | 78.98 | 28.63 | 76.44 |
| | filtrate | concentration (ppm) | 0.81 | 0.07 | 0.07 | 0.30 | 0.12 | 0.41 | 0.18 |
| | | reduction rate (%) | 6.5 | 94.13 | 93.72 | 67.62 | 89.65 | 49.31 | 85.46 |

TABLE 1-continued

| polymer | sample | | Cr | Cu | Zn | Pb | Co | Cd | Ni |
|---|---|---|---|---|---|---|---|---|---|
| 90 ppm | supernate | concentration (ppm) | 0.83 | 0.66 | 0.58 | 0.93 | 0.63 | 0.77 | 0.71 |
| | | reduction rate (%) | 4.59 | 43.71 | 48.69 | −1.21 | 46.56 | 4.32 | 42.42 |
| | filtrate | concentration (ppm) | 0.80 | 0.09 | 0.09 | 0.36 | 0.16 | 0.39 | 0.27 |
| | | reduction rate (%) | 8.28 | 92.08 | 91.95 | 61.36 | 86.01 | 51.29 | 77.95 |

Table 2 below shows the ICP analysis result (concentration) of each of Cr, Cu, Zn, Pb, Co, Cd and Ni in the stock solution (pH=9), the supernate and the filtrate and the reduction rate of each of Cr, Cu, Zn, Pb, Co, Cd and Ni after being treated by different concentrations (shown in table 2 below) of polymer obtained in example 5 and being filtered.

TABLE 2

| polymer | sample | | Cr | Cu | Zn | Pb | Co | Cd | Ni |
|---|---|---|---|---|---|---|---|---|---|
| 0 | the stock solution | concentration (ppm) | 1.19 | 1.33 | 1.19 | 1.21 | 1.11 | 1.14 | 1.2 |
| 9 ppm | supernate | concentration (ppm) | 1.00 | 0.15 | 0.14 | 0.33 | 0.13 | 0.31 | 0.13 |
| | | reduction rate (%) | 15.61 | 88.75 | 87.84 | 72.81 | 88.4 | 72.74 | 88.82 |
| | filtrate | concentration (ppm) | 1.00 | 0.03 | 0.35 | 0.24 | 0.02 | 0.21 | 0.32 |
| | | reduction rate (%) | 15.92 | 97.75 | 70.39 | 79.99 | 97.85 | 81.9 | 97.35 |
| 45 ppm | supernate | concentration (ppm) | 1.06 | 0.15 | 0.15 | 0.29 | 0.12 | 0.29 | 0.14 |
| | | reduction rate (%) | 10.66 | 88.57 | 87.76 | 76.29 | 89.12 | 74.75 | 88.67 |
| | filtrate | concentration (ppm) | 1.04 | 0.03 | 0.22 | 0.19 | 0.03 | 0.20 | 0.05 |
| | | reduction rate (%) | 12.4 | 97.5 | 81.15 | 84.07 | 97.18 | 82.5 | 96.22 |
| 90 ppm | supernate | concentration (ppm) | 1.12 | 0.15 | 0.14 | 0.26 | 0.13 | 0.28 | 0.16 |
| | | reduction rate (%) | 5.8 | 88.4 | 88.5 | 78.51 | 88.59 | 75.52 | 86.31 |
| | filtrate | concentration (ppm) | 1.12 | 0.08 | 0.19 | 0.20 | 0.04 | 0.20 | 0.08 |
| | | reduction rate (%) | 6.24 | 94.27 | 84.19 | 83.53 | 95.99 | 82.49 | 92.95 |

It can be seen from tables 1 and 2 above, after being treated by the polymers, the concentration of each of Cr, Cu, Zn, Pb, Co, Cd and Ni in the solution (supernate and filtrate) was reduced compared with in the stock solution. For most of Cr, Cu, Zn, Pb, Co, Cd and Ni, the removal efficiency in table 1 was lower than that in table 2. Further more, the residues of Cr, Cu, Zn, Pb, Co, Cd and Ni in the supernate and filtrate solutions were acceptable and close to each other since the removal efficiencies in table 2 were close, which suggests that filtration may be possibly omitted where filtration is undesirable.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for reducing the amount of heavy metals in an aqueous solution wherein the heavy metals comprise a member or members of the group consisting of Cr, Cu, Zn, Pb, Co, Cd, and Ni, said method comprising contacting said aqueous solution with an effective amount of a polymer having structural units of formula I and II to form precipitates, wherein I is

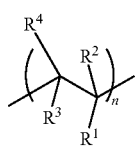

and II is

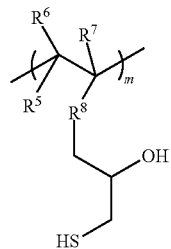

wherein $R^1$ is COOH; $R^2$ is H or methyl; $R^3$ and $R^4$ are H; $R^5$ and $R^6$ are H; $R^7$ is H or methyl and $R^8$ is —COO; and removing said precipitates from said aqueous solution.

2. The method of claim 1, wherein n is an integer greater than 0, m is an integer greater than 0, and the polymer has a molecular weight of from about 500 to about 2,000,000.

3. The method of claim 2, wherein the ratio of n to m is from about 1:99 to about 99:1.

4. The method of claim 1, wherein n:m is from about 60:40 to about 70:30, and the polymer has a Mw of from about 5,000 to about 100,000.

5. The method of claim 4, wherein a concentration ratio by weight of each of the at least one of the heavy metals to the polymer in the aqueous solution is from about 5:1 to about 1:100.

6. The method of claim 4, wherein a concentration ratio by weight of each of the at least one of the heavy metals to the polymer in the aqueous solution is from about 1:1 to about 1:50.

7. The method of claim 4, wherein a concentration ratio by weight of each of the at least one of the heavy metals to the polymer in the aqueous solution is from about 1:5 to about 1:20.

8. The method of claim 4, wherein the removing is by filtering the precipitates from the aqueous solution.

* * * * *